US011265104B2

United States Patent
K et al.

(10) Patent No.: US 11,265,104 B2
(45) Date of Patent: Mar. 1, 2022

(54) MECHANISM FOR INLINE PACKET RESPONSE GENERATION IN SOFTWARE DEFINED NETWORKS

(71) Applicant: Telefonaktiebolaget LM Ericsson (publ), Stockholm (SE)

(72) Inventors: Faseela K, Bengaluru (IN); Manu B, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 149 days.

(21) Appl. No.: 16/097,715

(22) PCT Filed: May 9, 2016

(86) PCT No.: PCT/IB2016/052643
§ 371 (c)(1),
(2) Date: Oct. 30, 2018

(87) PCT Pub. No.: WO2017/194989
PCT Pub. Date: Nov. 16, 2017

(65) Prior Publication Data
US 2019/0349127 A1  Nov. 14, 2019

(51) Int. Cl.
*H04L 1/00* (2006.01)
*H04L 1/18* (2006.01)
(Continued)

(52) U.S. Cl.
CPC .......... *H04L 1/0052* (2013.01); *H04L 1/1835* (2013.01); *H04L 49/3063* (2013.01);
(Continued)

(58) Field of Classification Search
CPC ... H04L 1/0052; H04L 49/70; H04L 49/3063; H04L 1/1835; H04L 67/34; H04L 43/028; H04L 43/026; H04L 41/0803; H04L 69/22
See application file for complete search history.

(56) References Cited

U.S. PATENT DOCUMENTS

2015/0019741 A1* 1/2015 DeCusatis ............... H04L 67/10
709/226
2017/0063732 A1* 3/2017 Park ........................ H04L 49/15
(Continued)

FOREIGN PATENT DOCUMENTS

WO    2015000517 A1    1/2015

OTHER PUBLICATIONS

Biofulco, et al., "Improving SDN with InSPired Switches," Proceedings of the Symposium on SDN Research, SOSR 16, ACM, Mar. 15, 2016, 12 pages. (Year: 2016).*
(Continued)

*Primary Examiner* — Thinh D Tran
(74) *Attorney, Agent, or Firm* — Sage Patent Group

(57) ABSTRACT

A method and system provide for inline packet response generation implemented by a network device functioning as a switch in a software defined networking (SDN) network. The method configures the flow control pipeline to enable the inline response generation without use of the control channel and SDN controller after configuration. The method includes connecting with the SDN controller, receiving a packet out data packet from SDN controller with a template message and a buffer identifier (ID) for the template message, and identifying the received packet out data packet as containing the template message. The method further includes installing the template message into a buffer with corresponding buffer ID, receiving a first data packet from the SDN controller identifying matching criteria and the
(Continued)

buffer ID, and updating a flow control pipeline to match on the matching criteria and to point to the buffer with the buffer ID.

15 Claims, 7 Drawing Sheets

(51) Int. Cl.
*H04L 49/00* (2022.01)
*H04L 69/22* (2022.01)
*H04L 43/026* (2022.01)
*H04L 67/00* (2022.01)
*H04L 41/0803* (2022.01)

(52) U.S. Cl.
CPC .......... *H04L 49/70* (2013.01); *H04L 41/0803* (2013.01); *H04L 43/026* (2013.01); *H04L 67/34* (2013.01); *H04L 69/22* (2013.01)

(56) References Cited

U.S. PATENT DOCUMENTS

| | | | |
|---|---|---|---|
| 2018/0241695 A1* | 8/2018 | Vaishnavi | H04L 49/30 |
| 2019/0124185 A1* | 4/2019 | Merkel | H04L 69/22 |
| 2020/0021519 A1* | 1/2020 | Schneider | H04L 45/64 |
| 2020/0186464 A1* | 6/2020 | Chatras | H04L 45/64 |

OTHER PUBLICATIONS

ONF TS-009, "OpenFlow Switch specification", version 1.3.2 (wire Protocol 0x04) filed on Apr. 25, 2013 (Year: 2013).*
Office Action dated Nov. 20, 2019 for European Patent Application No. 16722389.0, 8 pages.
Open Networking Foundation: "OpenFlow Switch Specification", Version 1.5.0 (Protocol version 0x06), Dec. 19, 2014, 277 pages.
Biofulco, et al., "Improving SDN with InSPired Switches," Proceedings of the Symposium on SDN Research, SOSR 16, ACM, Mar. 15, 2016, 12 pages.
ETSI GS NFV 002, V1.2.1, "Network Functions Virtualisation (NFV); Architectural Framework," Group Specification, Dec. 2014, 21 pages.
ETSI GS NFV-REL 001, V1.1.1, "Network Functions Virtualisation (NFV); Resiliency Requirements," Group Specification, Jan. 2015, 82 pages.

* cited by examiner

MECHANISM FOR INLINE PACKET RESPONSE GENERATION IN SOFTWARE DEFINED NETWORKS

CROSS-REFERENCE TO RELATED APPLICATIONS

This application is a national stage of International Application No. PCT/IB2016/052643, filed May 9, 2016, which is hereby incorporated by reference.

TECHNICAL FIELD

Embodiments of the invention relate to the field of software defined networking (SDN). More specifically, the embodiments relate to the management of switches in SDNs to reduce the amount of traffic between the switches and a controller of the SDN.

BACKGROUND

Software defined networking (SDN) is an architecture for computer networking that shifts many of the operations of network devices to a centralized controller. This enables network administrators to manage services in the SDN network more centrally and decreases the cost and complexity of the network devices. SDN networks decouple the control plane and the dataplane such that they do not have to be implemented by the same device.

Protocols are utilized to enable communication with and configuration of the network devices in the SDN network. Examples of such protocols include the OpenFlow protocol, the Open Network Environment and the Network Virtualization Platform. These protocols enable a controller that is remote from the network devices of the SDN to communicate with the network devices providing control plane functionality and to configure the network devices to implement the dataplane functions and policies desired by a network administrator.

In an SDN network, the network devices that implement the dataplane process received data packets by using a set of flow control policies that may be implemented via a flow control table, where the flow table includes a set of matching criteria to recognize relevant data in the data packet and trigger a set of actions to process the packet such as forwarding the packet on an identified port toward a destination. In some cases, the data packets are forwarded to the SDN controller for further processing. Often the data packets forwarded by the network device to the SDN controller require some type of response be sent to the network device that sent or originated the received data packet. In this case, the SDN controller receives the forwarded message and returns a response message to the network device that in turn forwards that message towards a sender of the received data packet.

SUMMARY

In one embodiment, a method is provided for inline packet response generation implemented by a network device functioning as a switch in a software defined networking (SDN) network. The method configures the flow control pipeline to enable the inline response generation without use of the control channel and SDN controller after configuration. The method includes connecting with the SDN controller, receiving a data packet from SDN controller with a template message and a buffer identifier (ID) for the template message, and identifying the received data packet as containing the template message. The method further includes installing the template message into a buffer with corresponding buffer ID, receiving a data packet from the SDN controller identifying matching criteria and the buffer ID, and updating a flow control pipeline to match on the matching criteria and to point to the buffer with the buffer ID.

In another embodiment, a network device is configured to execute the method for inline packet response generation. The network device functions as a switch in the SDN network. The method configures the flow control pipeline to enable the inline response generation without use of the control channel and SDN controller after configuration. The network device includes a non-transitory machine readable medium having stored therein an inline packet response generator, and a processor coupled to the non-transitory machine readable medium. The processor executes the inline packet response generator causing the network device to connect with the SDN controller, to receive a data packet from SDN controller with a template message and a buffer identifier (ID) for the template message, to identify the received data packet as containing the template message, to install the template message into a buffer with corresponding buffer ID, to receive a data packet from the SDN controller identifying matching criteria and the buffer ID, and to update a flow control pipeline to match on the matching criteria and to point to the buffer with the buffer ID.

In one embodiment, a computing device is configured to execute a plurality of virtual machines. The plurality of virtual machines implement network function virtualization (NFV). The computing device is in communication with a network device. The network device is in the SDN network. The network device is configured to implement the method for inline packet response generation. The network device functions as a switch in the SDN network. The method configures the flow control pipeline to enable the inline response generation without use of the control channel and SDN controller after configuration. The network device includes a non-transitory machine readable medium having stored therein an inline packet response generator, and a processor coupled to the non-transitory machine readable medium. The processor executes the inline packet response generator causing the network device to connect with the SDN controller, to receive a data packet from SDN controller with a template message and a buffer identifier (ID) for the template message, to identify the received data packet as containing the template message, to install the template message into a buffer with corresponding buffer ID, to receive a data packet from the SDN controller identifying matching criteria and the buffer ID, and to update a flow control pipeline to match on the matching criteria and to point to the buffer with the buffer ID.

In a further embodiment, a control plane device is configured to implement a control plane of a software defined networking (SDN) network including a network device. The network device is configured to implement a method for inline packet response generation. The network device functions as a switch in the SDN network. The method configures the flow control pipeline to enable the inline response generation without use of the control channel and SDN controller after configuration. The network device includes a non-transitory machine readable medium having stored therein an inline packet response manager, and a processor coupled to the non-transitory machine readable medium. The processor executes the inline packet response manager to connect with the switch, to determine a configuration for the switch, and to send a configuration message with a template message a buffer identifier (ID) to the switch.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
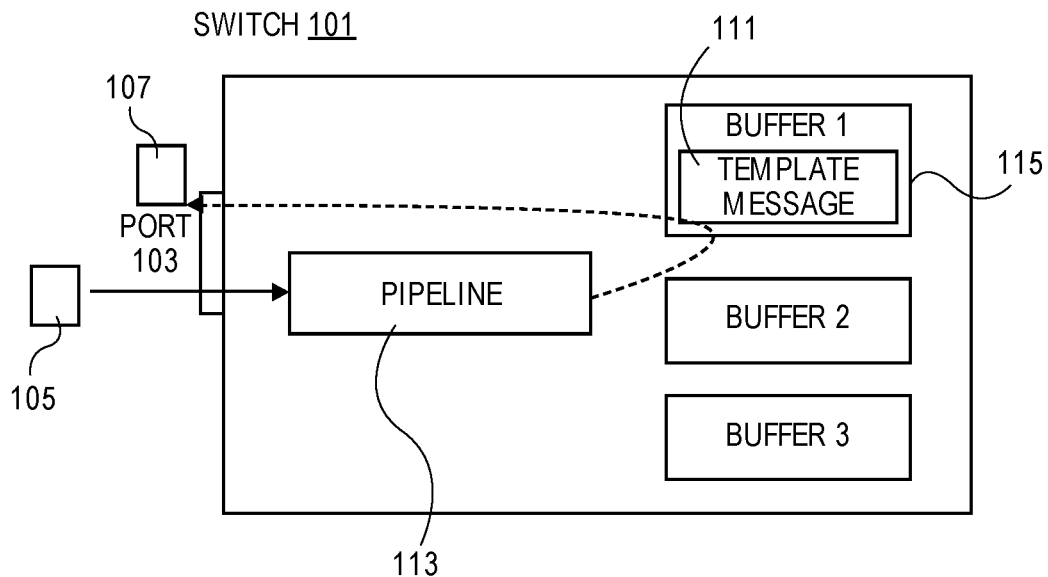
FIG. 1 is a diagram of one embodiment of a switch configured to handle incoming data packets using stored template messages in local buffers.

The following description describes methods and apparatus for configuring a network device functioning as a switch in a software defined networking (SDN) network to handle inline packet response generation. The SDN controller configures the switch to identify incoming packets that require a response without having to forward these received data packets to the SDN controller thereby improving the efficiency of the control channel between the SDN controller and the switch. The SDN controller configures the switch to store a template message in a local flow control pipeline buffer. The SDN controller further configures the switch to identify received data packets that can be responded to with in-line responses. The switch is configured to match on certain fields of incoming packets, where if a match is found, a response message is generated using the stored template message, by copying information from the received data packet to the template message and by further modifying the stored template message as needed. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

In a SDN network, a set of network devices, operating as switches, process data packets as they are received from other network devices of the SDN network or attached computing devices. Whenever an incoming data packet reaches a switch it is processed to determine how it is to be handled. This process may be implemented via a flow control table or similar mechanism. In some cases the sender of the received data packet expects a data packet to be returned in response, i.e., a response message. For example, this behavior may be expected in response to an Internet Control Message Protocol (ICMP), Address Resolution Protocol (ARP), Dynamic Host Configuration Protocol (DHCP) message or similar received data packet. The usual method in a Software Defined Networking (SDN) architecture is to 'punt,' i.e., forward, the packet to the SDN controller (e.g., as OpenFlow PACKET_IN Message) and the SDN controller generates a response for the received data packet and sends it back to the network device (e.g., inside an OpenFlow PACKET_OUT message towards the switch). The switch, in turn, forwards this received message towards the sender or originator of the data packet received by the switch.

The prior art solutions do not provide an efficient or comprehensive solution to handle such data packets. Thus, the switch is forced to forward a large number of data packets to the SDN controller for processing creating significant control plane traffic and introducing significant lag in response to the data packets. The most commonly used solution is the SDN controller generating responses for the incoming packets which results in, for example, PACKET_INs sent to the SDN controller, and then the SDN controller sends the response in the form of PACKET_OUTs to the message that are forwarded by the switch. This has the overhead of punting the packets every time to the SDN controller and generating responses via PACKET_OUT messages. In the case where the control channel is broken, this process can disrupt the normal functioning of the network.

There are some solutions to handle specific types of traffic received at the switch without forwarding it to the SDN controller. One example is an open virtual switch (OVS) ARP responder. Where an OVS ARP responder is implemented, ARP requests go into an ARP table, where pre-learned media access control (MAC) addresses reside. Rows in this ARP table are then matched against the (ARP protocol, network, Internet Protocol (IP) of the requested virtual machine (VM)) tuple. The resulting action is to construct an ARP reply that will contain the IP and MAC addresses of the remote VM, and will be sent back from the port it came in on to the VM making the original request. This solution needs implementation within the switch to maintain ARP Tables, and also intelligence to construct ARP replies inside the switch. Also the solution works only for ARP Packets. A similar OVS ICMP Responders handles ICMP messages in a similar fashion. Another example is OpenDayLight (ODL) Honeycomb, ODL Honeycomb is a local agent that executes on switches so that latency sensitive PACKET_INs can be handled by the agent, rather than punting to the remote SDN controller. This solution needs an ODL agent executing inside the switch, thus it dilutes the SDN architectural philosophy of having 'dumb' switches that do not have significant complexity such as specialized software agents.

The embodiments of the invention overcome these disadvantages of the prior art. The embodiments provide a mechanism to store packet response templates in buffers within the switch itself and handling the setting of appropriate fields of the template within the flow control table or flow 'pipeline.' In the embodiments, the SDN controller configures the buffers of the switch to store the packet response templates. The SDN controller can also program flow rules for different cases to point to the appropriate respective buffers. In other terms, the flow rules identify types of received data packets for which a stored packet response template is an appropriate basis for a response. Flow control actions (e.g., OpenFlow Actions) can be performed on the received data packets and in combination with the buffered templates to set different fields/copy respective fields from the incoming data packet, and then forward the final packet response towards a sender of the incoming data packet or the originator of the incoming data packet. The embodiments provide advantages over the art by providing a faster response for handling received data packets at switches in the SDN network. The embodiments also avoid unnecessary control packet exchanges with the SDN controller (e.g., PACKET_IN/PACKET_OUT messages). The embodiments thereby optimize control channel (i.e., communication between the switches and SDN controller) performance. The embodiments utilize mostly existing architecture of switches via a generic implementation which can work for different packet types while relying on relatively minimal alterations to the flow control protocols and switch architecture to implement. Thus, the embodiments are consistent with the general operation and design of switches in an SDN network.

FIG. 1 is a diagram of one embodiment of a switch configured to handle incoming data packets using stored template messages in local buffers. The embodiments provide a mechanism to minimize traffic with the SDN controller and have the packet response templates in buffers within the switch itself. The embodiments provide for the configuration of the flow control table or flow control pipeline for the setting of appropriate fields of the template for a given received data packet. In the embodiments discussed herein below the handling of an Internet Control Message Protocol (ICMP) error response is provided by way of an example, but not limitation. One skilled in the art would understand that the principles, structures and processes described with relation to the handling of an ICMP error responses can also be applied to handling different types of received data packets and responses.

A basic switch implemented by a network device is illustrated in FIG. 1. The architecture of the switch has been simplified and abstracted for sake of clarity. The switch 101 includes at least one port 103 over which data packets are received. An incoming data packet 105 is received at a port 103 and sent to the flow control pipeline 113 for processing. The flow control pipeline 113 or flow control table has a set of entries therein that access various fields or regions of the incoming data packet 105 to determine information about the incoming 105 data packet and determine how to process the incoming data packet 105. The entries typically seek match information in the incoming data packet 105 to determine how to process the incoming data packet 105. For example, a destination address field may be accessed to determine how to forward the incoming data packet. In the example case where the received message has a problem associated with it, for example an unreachable destination address, the sender of the incoming data packet is sent an ICMP message in response. In the prior art, the incoming data packet would be sent to the SDN controller, which would reply with an appropriate response message to be forwarded by the switch.

However, in the embodiments the SDN controller has configured an entry or set of entries in the flow control table or pipeline 113 to access a buffer 115 containing a template message 111 for an ICMP response. A 'set,' as used herein refers to any whole number of items including one item. The table entries can include actions that include copying or otherwise modifying the data in the template message using data in the incoming data packet or derived therefrom. Once the flow control pipeline 113 or flow control table has completed modifying the template message, the template message is sent out on the port over which the incoming data packet was received as an outgoing data packet 107. The switch 101 can be configured to store any number of template messages in the buffers and to generate any number of different types of outgoing data packets using the template messages as a basis for these reply messages.

Figure 2:
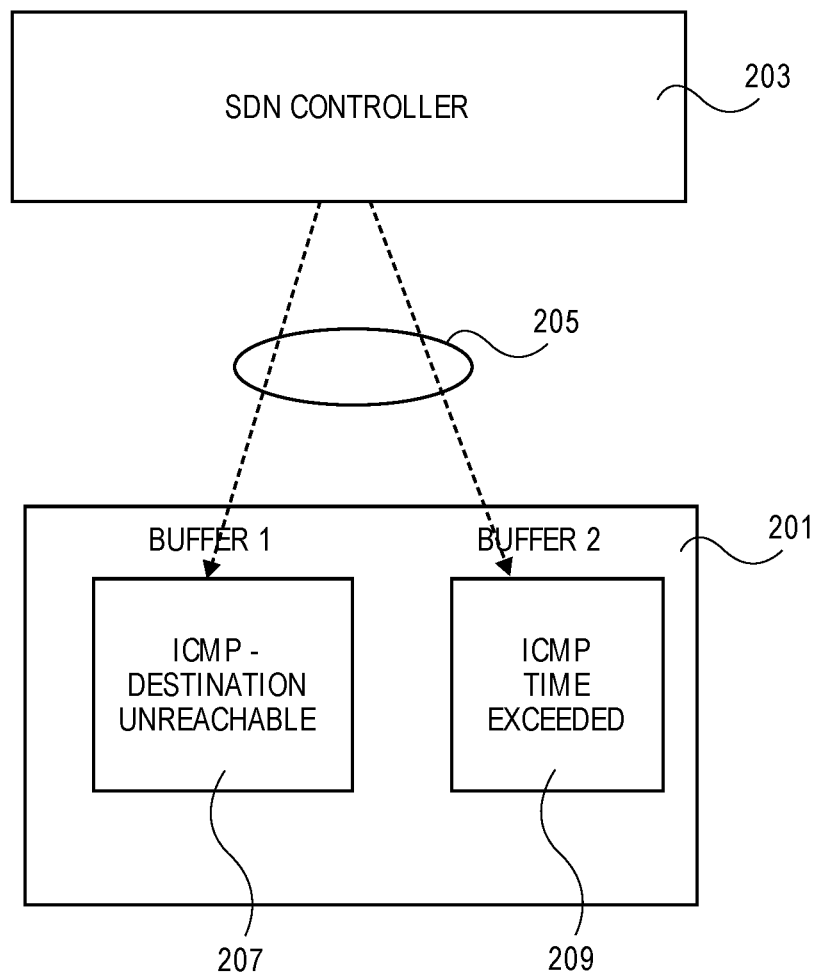
FIG. 2 is a diagram illustrating the configuration of the switch buffers to store template messages.

FIG. 2 is a diagram illustrating the configuration of the switch buffers to store template messages. The illustration is an abstraction of the configuration process where the switch 201 is configured by the SDN controller 203. The switch 201 connects with the SDN controller 203 over a control channel 205. The control channel 205 can be any network connection covering any number of intermediate network devices. The SDN controller 203 can be located on any computing device and is typically remote from the switch 201 that is implemented by a network device.

The SDN controller 203 configures the switch 201 by installing a set of template messages 207, 209 into the available buffers of the switch 201. These buffers may be flow control pipeline buffers or similar storage devices within the switch. The SDN controller 203 identifies the buffers into which the template messages are to be stored using buffer identifiers (IDs) or similar identifiers.

In one example embodiment, this configuration can be implemented using existing flow control protocols. For example, the configuration can be implemented using OpenFlow without any openflow extension by making use of the OpenFlow Packet_Out Message.

The Packet_Out message in OpenFlow has the following structure:

```
/* Send packet (controller -> datapath). */
    struct ofp_packet_out {
        struct ofp_header header;
        uint32_t buffer_id; /* ID assigned by datapath
        (OFP_NO_BUFFER if none).
        */
        uint16_t actions_len; /* Size of action array in bytes. */
        uint8_t pad[2]; /* Align to 64 bits. */
        struct ofp_match match; /* Packet pipeline fields. Variable size. */
        /* The variable size and padded match is followed by the list of
        actions. */ /*
        struct ofp_action_header actions[0]; *//* Action list - 0 or more. */
        /* The variable size action list is optionally followed by packet data.
         * This data is only present and meaningful if buffer_id == -1. */ /*
        uint8_t data[0]; */ /* Packet data. The length is inferred from the
        length field in the header. */
    }; OFP_ASSERT(sizeof(struct ofp_packet_out) == 24);
```

In OpenFlow, the buffer-id is something that is generated by a switch and conveyed to the controller in a packet_in message. The embodiments also provide a method for the SDN controller 203 to generate a buffer ID and assign it to a packet_out. The template message can be embedded in the data portion of the packet_out. Whenever a switch 201 receives a packet_out message without any action fields, it can be considered as an indication of template message configuration, and the switch 201 can use the buffer ID specified in the message as the buffer ID for packet template storage.

The SDN controller 203 is also responsible for configuring flow control pipeline or table entries to point to the appropriate buffers. The SDN controller 203 knows the buffer IDs of respective templates messages by either being notified by the switch 201 or assigning them when sending the template messages. The SDN controller is able to program flow rules in the flow control pipeline to point to the respective buffers based on the required matching criteria, which is specified by the SDN controller 203. This step can be implemented using an extension of existing flow control protocols. For example, an OpenFlow extension can be defined to specify buffer ID as an action type.

Currently, OpenFlow supports only specifying buffer_id in Packet_Out messages. This can be enhanced to be used in OpenFlow rules as well. In such an extension, the OpenFlow rule would function such that whenever the action "Buffer" is applied, that means the current packet under processing by the flow control pipeline will be replaced by the packet template in the buffer. For example, for a destination host unreachable ICMP error response, the SDN controller 203 can define a default flow in the L3 Forwarding table of the flow control pipeline (e.g., an OpenFlow pipeline) as:

TABLE MISS, action: Buffer Buffer_Id (where buffer id points to the ICMP Error template)

The configuration of the switch 201 by the SDN controller 203 also can include defining actions to copy fields from incoming packet to the buffered template message. In one example, the process may be implemented using OpenFlow. OpenFlow has the concept of PACKET registers which can be used when copying fields. The packet register fields OXM_OF_PKT_REG(N) can be used to store temporary values and information alongside the packet through pipeline processing. Each packet register is 64 bit wide and maskable. In most cases, the packet registers cannot be matched in tables, i.e. they usually cannot be used in the flow entry match structure. They can be used with the set-field and copy-field actions.

In some embodiments, the PACKET registers are used to copy the fields from the current incoming data packet that need to be copied to the packet template, before pointing to the buffer containing the template message. Once the template message is accessed, the PACKET register values can be copied back to the respective fields in the template message.

For example, an ICMP Error response for an L3 forwarding Table Miss should copy the source fields of the incoming data packet to the destination fields of the ICMP Response. In some embodiment, the copy field Action of OpenFlow can be enhanced to copy fields from the current packet to the buffered template message. For example:

---
TABLE MISS, actions=copy required fields from incoming packet,
    apply Buffer Buffer_Id,
    Move the copied fields to appropriate fields in the template
---

The SDN controller 203 can be further responsible for configuring actions of the flow control pipeline to set fields of a template message in the OpenFlow pipeline. Once the copy field action is performed to copy data from the incoming data packet to the template message, the template message can be further processed by the flow control pipeline. The flow control pipeline can be configured to further set fields of the template message. The SDN controller 203 can configure actions other than copies to insert or modify data in the template message. For example, when generating a dynamic host control protocol (DHCP) OFFER message in response to a DHCP request, and the SDN controller 203 is aware of the Internet Protocol (IP) addresses to be allocated, setting the IP address in the template message can be performed in the pipeline using set-field action.

An example of the configuration of a flow control pipeline, in this case an OpenFlow pipeline is provided below by way of example, where the flow control pipeline has been configured to generate an ICMP destination host not reachable response without having to send a data packet to the SDN controller.

TABLE 0

---
PORT TABLE
    cookie=0x8000000, duration=8645.826s, table=0, n_packets=0,
    n_bytes=0, priority=4,in_port=2
    actions=write_metadata:0x50000000000/0xfffff0000000000,
    goto_table:21
---

TABLE 21

---
L3 FORWARDING TABLE
    TABLE MISS : table=21, n_packets=0, n_bytes=0, priority=0
    actions=copy(eth_src,reg_1), copy(src_ip, reg_2),
    buffer=[buffer 2],
    copy(reg_1,eth_dst),copy(reg_2,dst_ip),
    output_port : 2
---

An example of the configuration of a flow control pipeline, in this case an OpenFlow pipeline is provided below by way of example, where the flow control pipeline has been configured to generate an ICMP destination host not reachable response without having to send a data packet to the SDN controller.

Figure 3A:
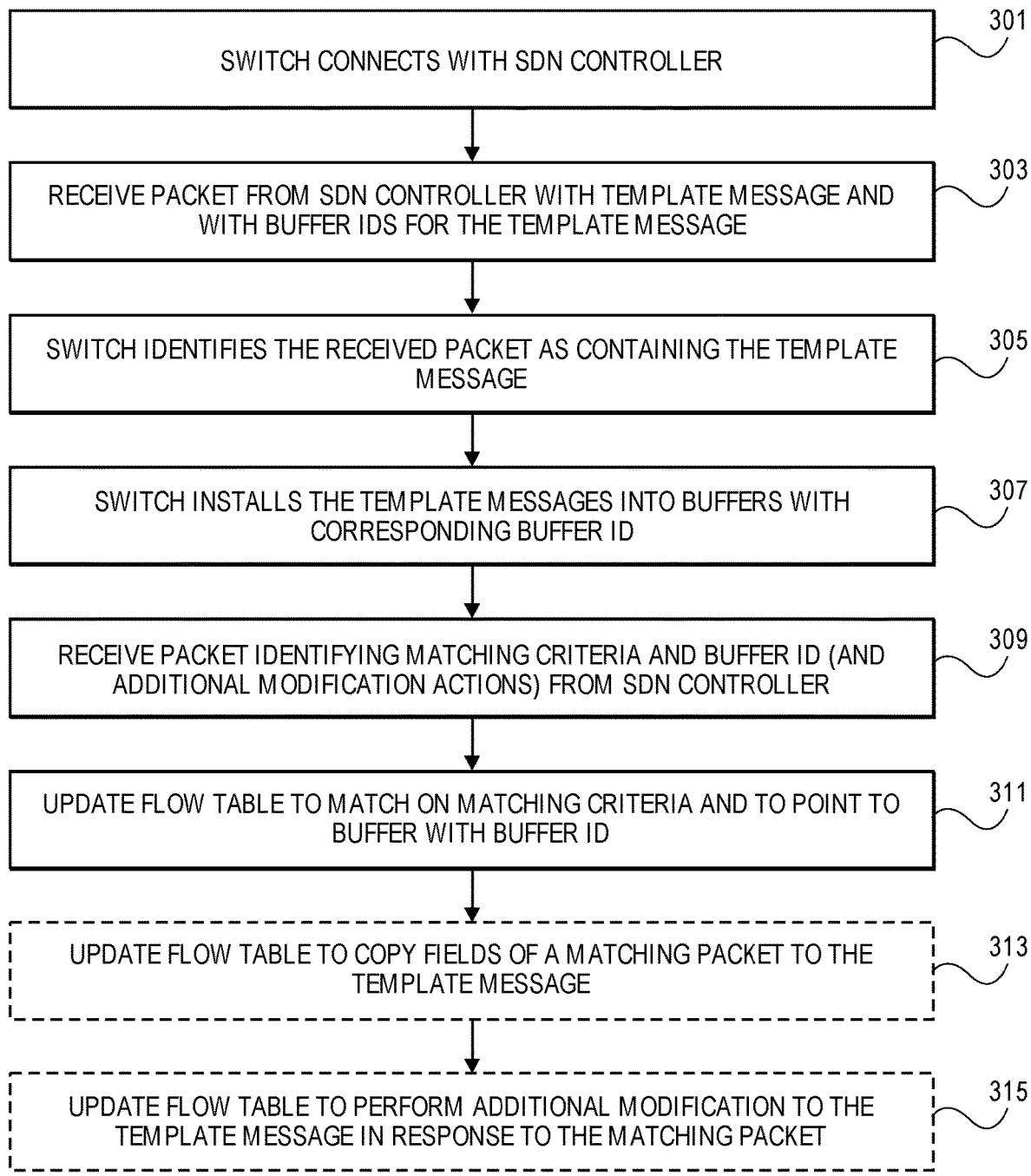
FIG. 3A is a flowchart of one embodiment of the process implemented by a switch in an SDN for configuring the switch as directed by an SDN controller.

FIG. 3A is a flowchart of one embodiment of the process implemented by a switch in an SDN for configuring the switch as directed by an SDN controller. The process can be initiated during a connection of the switch with the SDN network and more specifically, when the switch connects with the SDN controller (Block 301). The switch can connect to the SDN controller using any flow control protocol such as OpenFlow or a similar protocol. The switch and the SDN controller establish a control channel, i.e., a control plane for the SDN network.

In the process of establishing the control channel the switch may provide information about the buffers in the flow control pipeline. In other embodiments, the SDN controller may query for the switch for the buffer information and in particular a buffer ID for each available buffer. Once the SDN controller has the available buffer information it determines what inline packet response generation is to be installed in the switch. For example, inline packet response may be established to handle the generation of ICMP, DHCP and similar protocol response messages. Each inline packet response may correspond with a set of template messages. These template messages are incomplete packets that are completed by copying information from incoming data packets at the switch or by setting fields of the template messages at the switch.

Once the SDN controller has determined the inline packet response generation to be installed it sends a packet with the associated template message and the buffer ID in which the template message is to be stored (Block 303). The switch receives this packet and determines that it is a packet containing a template message (Block 305). This can be determined by the type of the packet or by the value of designated fields in the packet. The switch then stores the template message in the buffer corresponding with the buffer ID in the flow control pipeline (Block 307).

The SDN controller follows sending of the template message with a set of packets that set the flow rules in the flow control pipeline that make use of the template message. The SDN controller sends packets that identify matching criteria and the buffer ID of the template message to be used where the matching criteria are met (Block 309). The switch installs flow entries and actions to trigger on the matching criteria and to access the buffer with the buffer ID to generate a response message using the template message (Block 311). The matching criteria can include any identifying information in a packet or the lack thereof. The actions triggered can include the copying of data using pipeline registers or similar storage structures to transfer data from incoming data packets to the template messages to generate new outgoing data packets (Block 313). In some embodiments, the switch installs additional actions in the flow entries to further modify the template messages (Block 315). The additional actions can include actions to set various fields of the template messages. Any field or section of the template message can be modified in anyway by pacing the appropriate action in the flow entry of the flow control pipeline.

Figure 3B:
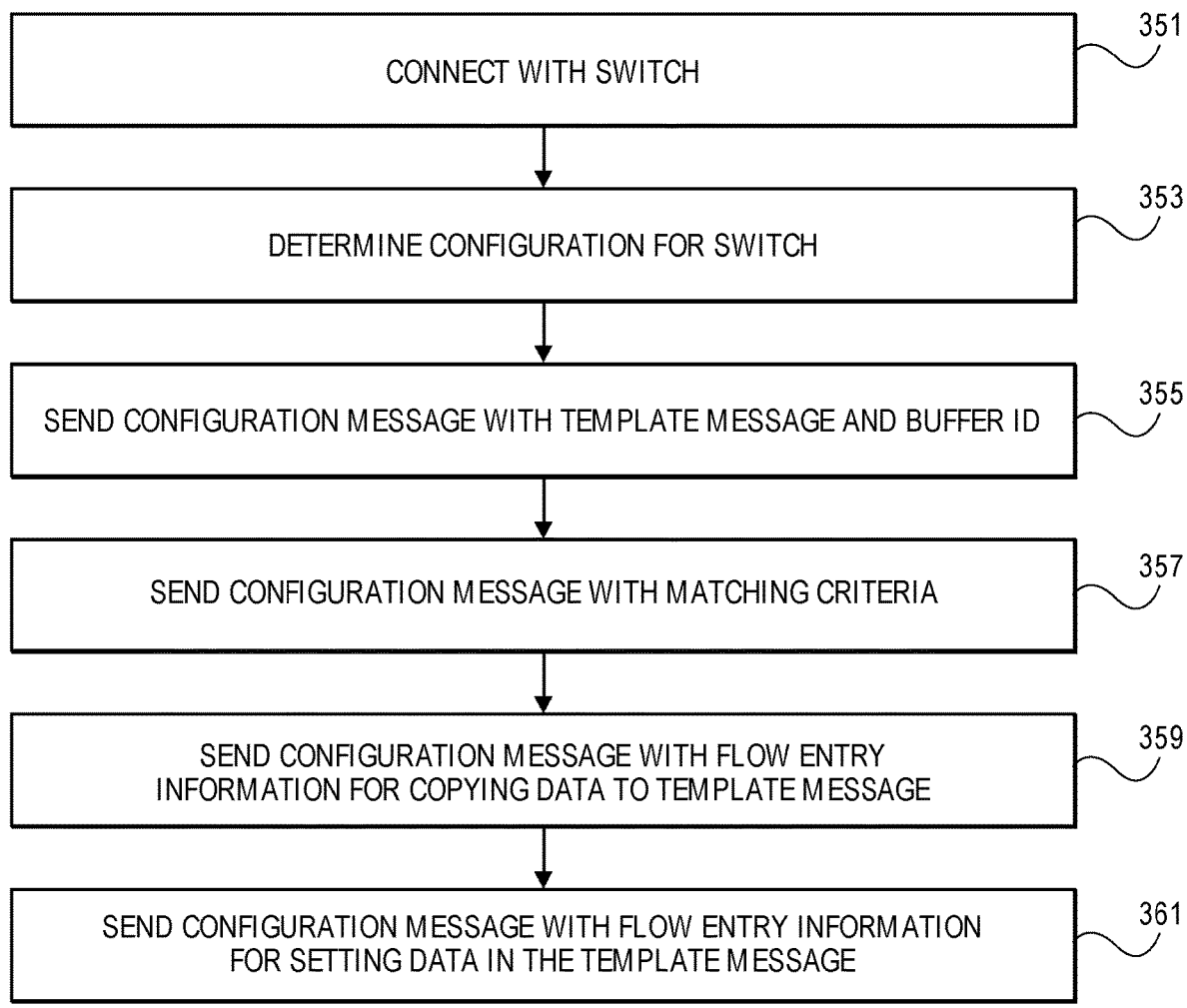
FIG. 3B is a flowchart of one embodiment of the configuration process as implemented by the SDN controller.

FIG. 3B is a flowchart of one embodiment of the configuration process as implemented by the SDN controller. In conjunction with the process for configuration as described above for the switch, the process at the SDN controller begins in response to a connection request from the switch (Block 351). The connection request is negotiated to establish a control channel or similar control plane communication between the switch and the SDN controller. In this process the switch may provide information about the buffers in the flow control pipeline and similar characteristics of the switch. In further embodiments, the SDN controller may query the switch for such information. The SDN then determines the configuration for the switch (Block 353). This configuration can be set by a network administrator, a set of default rules, or similarly established. The configuration can include a set of flow rules that are to manage inline packet response generation amongst other aspects of the switch. For each flow rule or set of flow rules a set of template messages can be installed in the switch to be utilized to generate response messages based on matching criteria for processing incoming data packets at the switch. A configuration message with the template message is sent. The configuration message includes a buffer ID of the buffer into which the template message is to be stored (Block 355).

In addition to installing the template message, the SDN controller can send a configuration message to the switch that identifies the matching criteria for processing incoming data packets at the switch that identifies the information or lack thereof in given incoming data packets for which a response message based on a template message is formed (Block 357). In the same configuration message or in a separate configuration message, flow entry information for copying data to the template message is provided (Block 359). The flow entry information can define actions to be executed to transfer data from specified fields of an incoming data block to registers and/or to the template message. In the same configuration message or in a separate configuration message, flow entry information for setting data in the template message is provided (Block 361).

Figure 4:
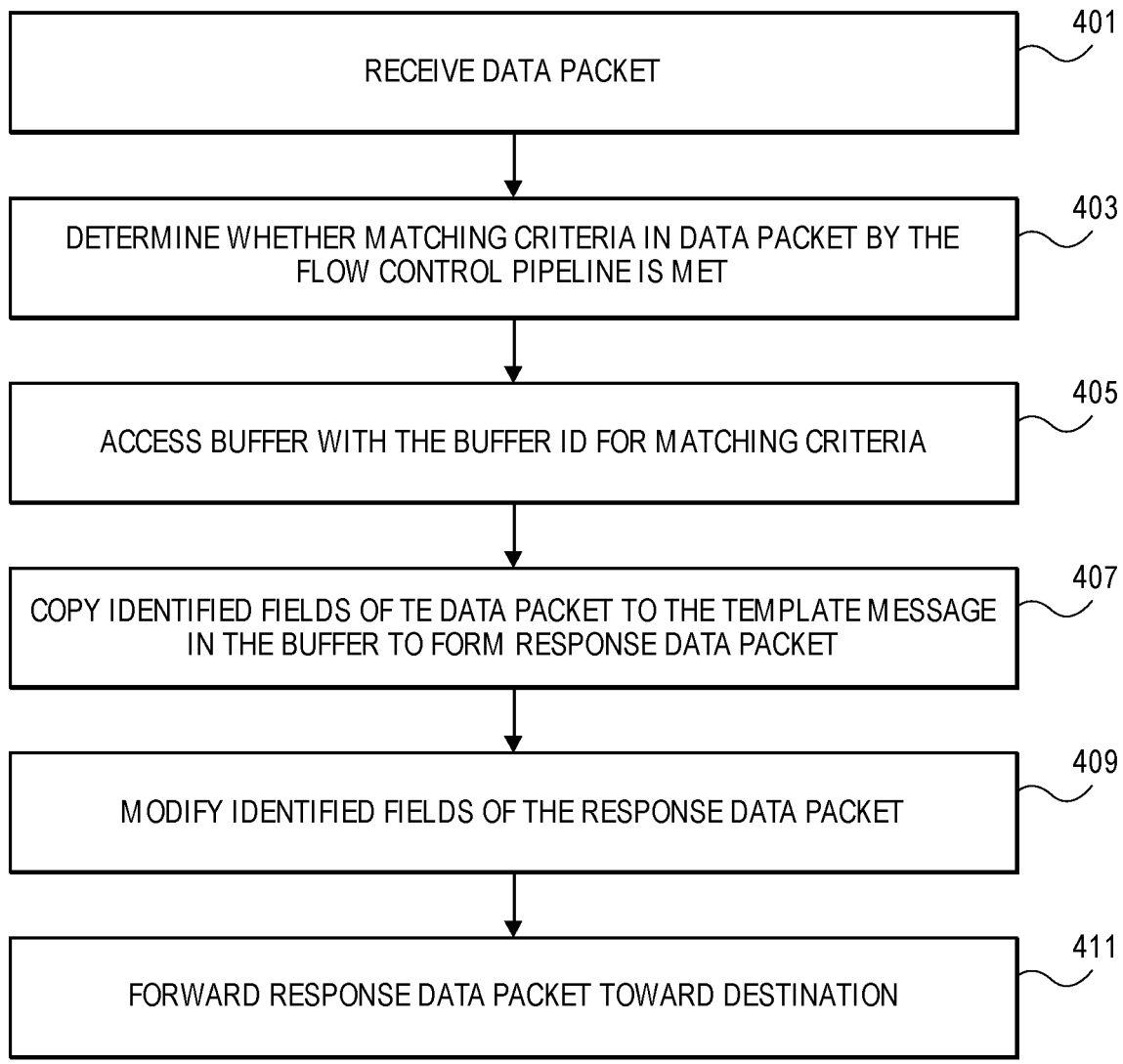
FIG. 4 is a diagram one embodiment of the process for generating inline packet responses at a switch in the SDN network.

FIG. 4 is a diagram one embodiment of the process for generating inline packet responses at a switch in the SDN network. After the configuration process described herein above, when the switch receives data packets that are configured for generating an inline packet response at the switch without the further intervention of the SDN controller, the process is triggered in response to receiving a data packet (Block 401). The data packet is received via a port of the network device implementing the switch. The incoming data packet is processed by the flow control pipeline by matching it against criteria in the flow entries of the flow control pipeline (Block 403). Where a match is made, then an action will identify the buffer containing an associated template message using the buffer ID of the buffer (Block 405). This template message is then accessed in the buffer to begin generating the inline response data packet to be returned via the receiving port.

Where appropriate for the response data packet, the flow entry may also define a copying action to copy identified fields of the data packet to the template message (Block 407). Any number of fields of the incoming data packet can be copied to any number of fields of the response data packet. Where appropriate for the response data packet, the same flow entry or another flow entry may define modification or set field actions to change or insert data into the response data packet (Block 409). Any number of fields of the response data packet can be modified. Once the response data packet has been thus configured, it can be forwarded toward a destination via the inbound port, a sender address or an originator address (Block 411).

Architecture

Figure 5A:
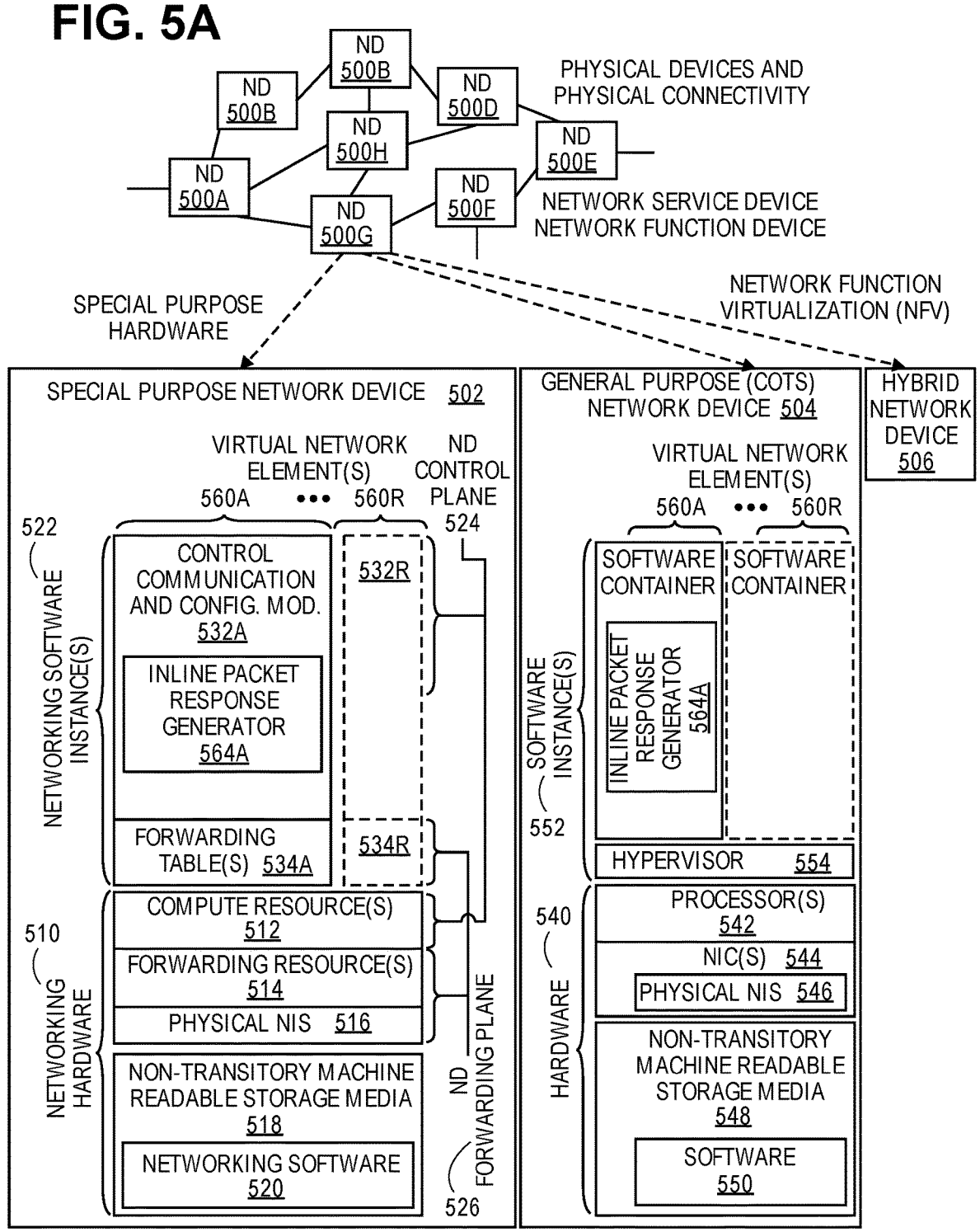
FIG. 5A illustrates connectivity between network devices (NDs) within an exemplary network, as well as three exemplary implementations of the NDs, according to some embodiments of the invention.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application-specific integrated-circuits (ASICs) and a special-purpose operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
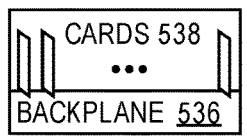
FIG. 5B illustrates an exemplary way to implement a special-purpose network device according to some embodiments of the invention.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. The application can include an inline packet response generator 564A-R that implements the functions described herein above (e.g., in reference to the method described in relation to FIGS. 3A and 4). While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R -e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the NIC(s) 544, as well as optionally between the instances 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
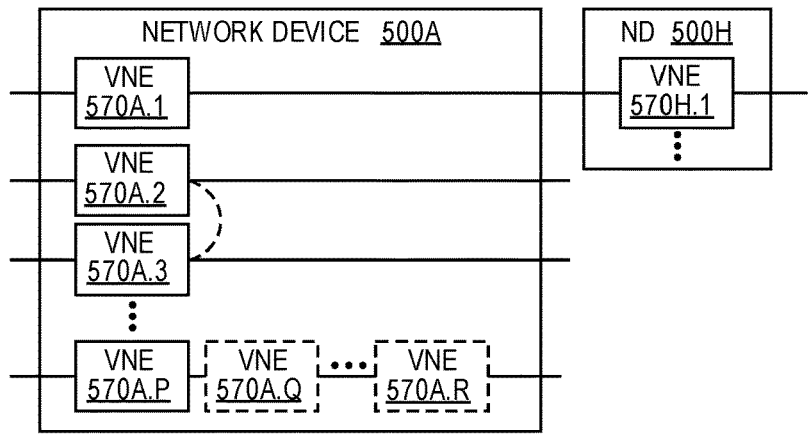
FIG. 5C illustrates various exemplary ways in which virtual network elements (VNEs) may be coupled according to some embodiments of the invention.

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service— e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
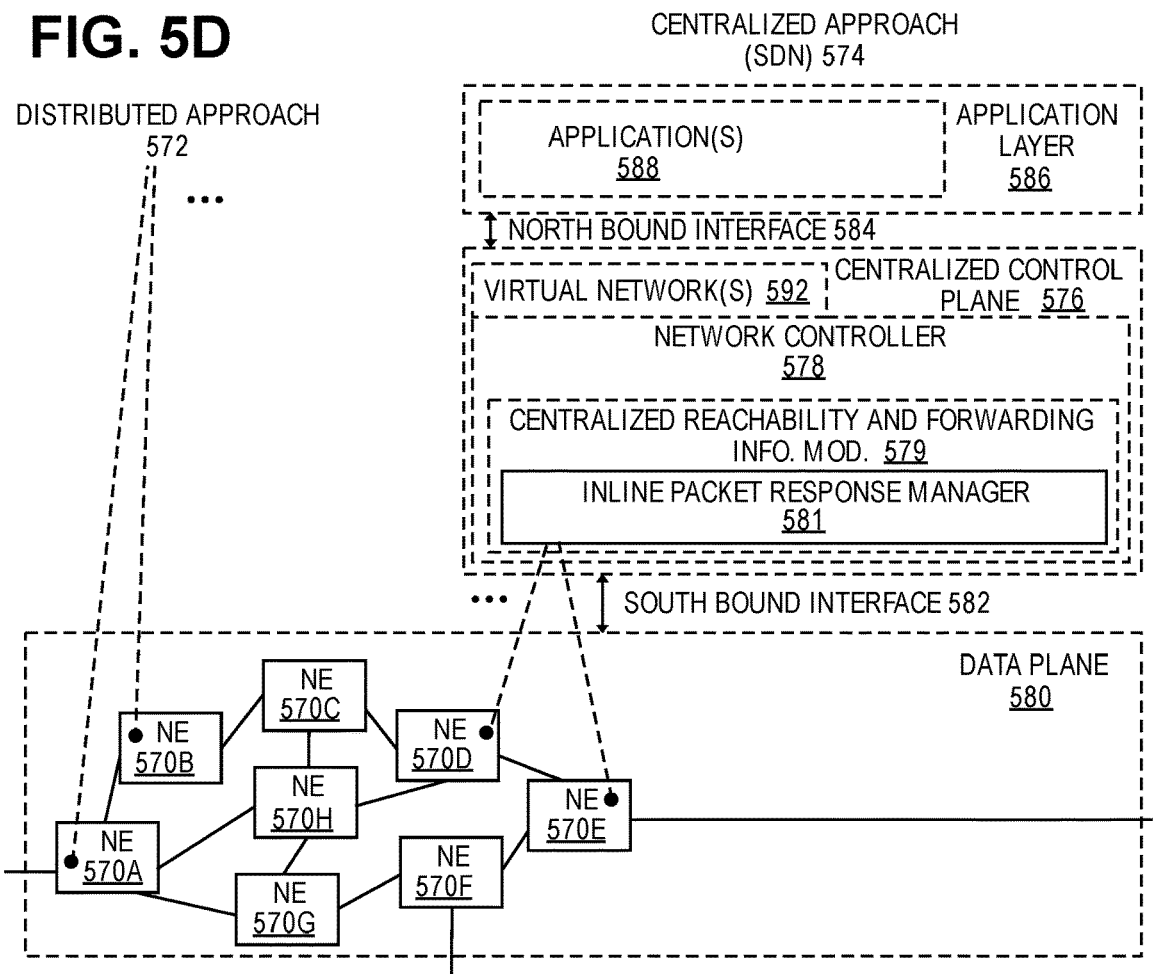
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG.

5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In some embodiments, the applications 588 may include an inline packer response manager that implements functions described herein above (e.g., in regard to the method described in relation to FIG. 3B), while in other embodiments the inline packet response manager 581 may be implemented in other layers of the SDN controller such as in the centralized control plane 576.

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
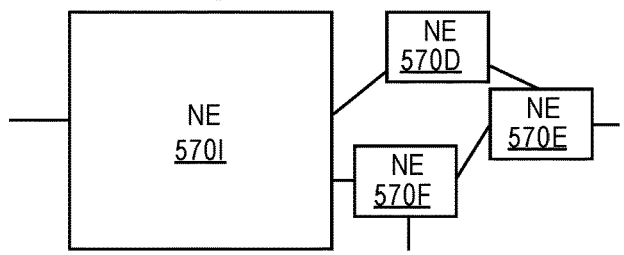
FIG. 5E illustrates the simple case of where each of the NDs implements a single NE, but a centralized control plane has abstracted multiple of the NEs in different NDs into (to represent) a single NE in one of the virtual network(s), according to some embodiments of the invention.
Figure 5F:
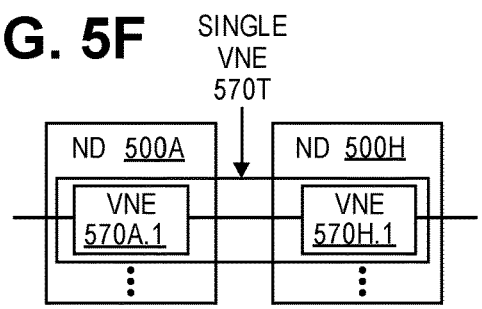
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 570I is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
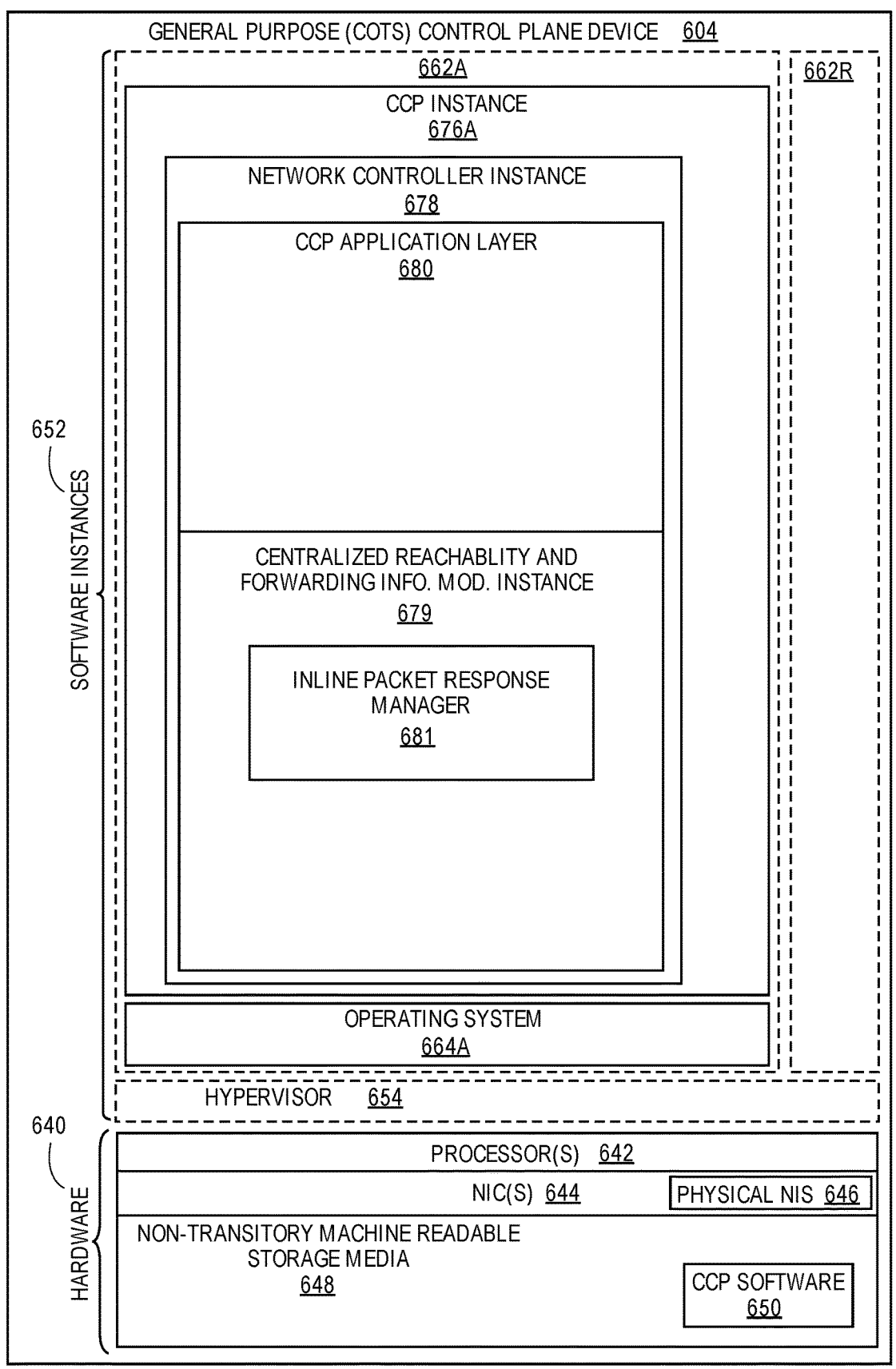
FIG. 6 illustrates a general purpose control plane device with centralized control plane (CCP) software 650), according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (WM)) or a hypervisor executing on top of a host operating system, and an application is run on top of a guest operating system within an instance 662A-R called a virtual machine (which in some cases may be considered a tightly isolated form of software container) that is run by the hypervisor ; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view. In some embodiments, an inline packet response manager (e.g., implementing the methods described in relation to FIG. 3B) may be implemented as a component of any part of the network controller instance 678 such as the centralized reachability and forwarding information module instance 679.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for inline packet response generation implemented by a network device functioning as a switch in a software defined networking (SDN) network, the method to configure a flow control pipeline to enable the inline packet response generation without use of a control channel and SDN controller after configuration, the method comprising:
   connecting with the SDN controller;
   receiving an OpenFlow packet_out data packet from the SDN controller with a template message and a buffer identifier (ID) for the template message;
   identifying the received OpenFlow packet_out data packet without any action fields as containing the template message;
   installing the template message into a buffer with corresponding buffer ID;
   receiving a data packet from the SDN controller identifying matching criteria and the buffer ID;
   determining whether matching criteria in the data packet is met by the flow control pipeline;
   copying identified fields of the data packet to the template message to form a response data packet, if the matching criteria is met; and
   forwarding the response data packet as a generated in-line response message towards a destination.

2. The method of claim 1, further comprising:
updating a flow control pipeline to match on the matching criteria and to point to the buffer with the buffer ID; and
updating a flow control pipeline to copy fields of a matching packet to the template message.

3. The method of claim 2, further comprising:
updating the flow control pipeline to modify the template message by setting fields of the template message in response to determining a match of the matching criteria.

4. The method of claim 1, further comprising:
accessing the buffer with the buffer ID for the matching criteria.

5. The method of claim 1, further comprising:
modifying identified fields of the response data packet.

6. A network device configured to execute a method for inline packet response generation, the network device being configured to function as a switch in a software defined networking (SDN) network, the method to configure a flow control pipeline to enable the inline packet response generation without use of a control channel and SDN controller after configuration, the network device comprising:
a non-transitory machine readable medium having stored therein an inline packet response generator; and
a processor coupled to the non-transitory machine readable medium, the processor to execute the inline packet response generator causing the network device to connect with the SDN controller, to receive an OpenFlow packet_out data packet from the SDN controller with a template message and a buffer identifier (ID) for the template message, to identify the received OpenFlow packet_out data packet without any action fields as containing the template message, to install the template message into a buffer with corresponding buffer ID, to receive a data packet from the SDN controller identifying matching criteria and the buffer ID, and to determine whether matching criteria in the data packet is met by the flow control pipeline, to copy identified fields of the data packet to the template message to form a response data packet, if the matching criteria is met, and to forward the response data packet as a generated in-line response message towards a destination.

7. The network device of claim 6, the processor to execute the inline packet response generator to update a flow control pipeline to match on matching criteria and to point to the buffer with the buffer ID; and to update a flow control pipeline to copy fields of a matching packet to the template message.

8. The network device of claim 7, the processor to execute the inline packet response generator to update the flow control pipeline to modify the template message by setting fields of the template message in response to determining a match of the matching criteria.

9. The network device of claim 6, the processor to execute the inline packet response generator to access the buffer with the buffer ID for the matching criteria.

10. The network device of claim 6, the processor to execute the inline packet response generator to modify identified fields of the response data packet.

11. A computing device configured to execute a plurality of virtual machines, the plurality of virtual machines implementing network function virtualization (NFV), the computing device in communication with a network device, the network device in a software defined networking (SDN) network, the computing device configured to implement a method for inline packet response generation, the network device functioning as a switch in the SDN network, the method to configure a flow control pipeline to enable the inline packet response generation without use of a control channel and SDN controller after configuration, the computing device comprising:
a non-transitory machine readable medium having stored therein an inline packet response generator; and
a processor coupled to the non-transitory machine readable medium, the processor to execute the inline packet response generator causing the network device to connect with the SDN controller, to receive an OpenFlow packet_out data packet from the SDN controller with a template message and a buffer identifier (ID) for the template message, to identify the received OpenFlow packet_out data packet without any action fields as containing the template message, to install the template message into a buffer with corresponding buffer ID, to receive a first data packet from the SDN controller identifying matching criteria and the buffer ID, and to determine whether matching criteria in the data packet is met by the flow control pipeline, to copy identified fields of the data packet to the template message to form a response data packet, if the matching criteria is met, and to forward the response data packet as a generated in-line response message towards a destination.

12. The computing device of claim 11, the processor to update a flow control pipeline to match on matching criteria and to point to the buffer with the buffer ID;
and to execute the inline packet response generator to update a flow control pipeline to copy fields of a matching packet to the template message.

13. The computing device of claim 12, the processor to execute the inline packet response generator to update the flow control pipeline to modify the template message by setting fields of the template message in response to determining a match of the matching criteria.

14. The computing device of claim 11, the processor to execute the inline packet response generator to access the buffer with the buffer ID for the matching criteria.

15. The computing device of claim 11, the processor to execute the inline packet response generator to modify identified fields of the response data packet.

* * * * *